United States Patent
Omole et al.

(10) Patent No.: US 8,784,532 B2
(45) Date of Patent: Jul. 22, 2014

(54) SORBENT REGENERATION IN A HEATED HOLLOW-FIBER ASSEMBLY

(75) Inventors: Imona C. Omole, Bartlesville, OK (US); George F. Schuette, Ramona, OK (US)

(73) Assignee: Phillips 66 Company, Houston, TX (US)

( * ) Notice: Subject to any disclaimer, the term of this patent is extended or adjusted under 35 U.S.C. 154(b) by 125 days.

(21) Appl. No.: 13/409,972

(22) Filed: Mar. 1, 2012

(65) Prior Publication Data

US 2012/0285319 A1 Nov. 15, 2012

Related U.S. Application Data

(60) Provisional application No. 61/448,858, filed on Mar. 3, 2011.

(51) Int. Cl.

| B01D 53/22 | (2006.01) |
|---|---|
| B01D 19/00 | (2006.01) |
| B01D 69/08 | (2006.01) |
| B01D 53/14 | (2006.01) |
| B01J 20/28 | (2006.01) |
| F23J 15/04 | (2006.01) |
| B01D 63/02 | (2006.01) |

(52) U.S. Cl.
CPC ........ *B01J 20/28023* (2013.01); *F23L 2215/50* (2013.01); *B01D 53/229* (2013.01); *B01J 20/2805* (2013.01); *B01D 2258/0283* (2013.01); *B01D 2257/304* (2013.01); *B01D 2313/22* (2013.01); *F23J 15/04* (2013.01); *Y02C 10/06* (2013.01); *B01D 2313/36* (2013.01); *B01D 2252/20405* (2013.01); *B01D 53/1475* (2013.01); *B01D 63/02* (2013.01); *B01D 2252/20484* (2013.01); *B01D 2311/13* (2013.01); *B01D 53/22* (2013.01); *B01D 53/1425* (2013.01); *Y02C 10/10* (2013.01); *B01D 69/087* (2013.01)

USPC ............ 95/46; 95/49; 95/51; 95/181; 95/183; 95/187; 96/6; 96/242

(58) Field of Classification Search
USPC ........... 95/45, 46, 49, 51, 179, 183, 187, 181; 96/4, 6, 234, 242
See application file for complete search history.

(56) References Cited

U.S. PATENT DOCUMENTS

| 4,804,475 A * | 2/1989 | Sirinyan et al. ................ 95/56 |
| 5,104,425 A * | 4/1992 | Rao et al. ......................... 95/47 |

(Continued)

FOREIGN PATENT DOCUMENTS

| WO | 2006049610 | 5/2006 | |
| WO | WO 2011/018479 A1 * | 2/2011 | ............. B01D 53/14 |

OTHER PUBLICATIONS

K. Shimada, I.N. Seekkuarachchi & H. Kumazawa, "Absorption of CO2 Into Aqueous Solutions of Sterically Hindered Methyl Aminoethanol Using a Hydrophobic Microporous Hollow Fiber Contained Contactor," Abstract, 2 pages, 2007.

(Continued)

*Primary Examiner* — Jason M Greene
(74) *Attorney, Agent, or Firm* — Phillips 66 Company

(57) ABSTRACT

Methods and apparatus relate to recovery of carbon dioxide and/or hydrogen sulfide from a gas mixture. Separating of the carbon dioxide, for example, from the gas mixture utilizes a liquid sorbent for the carbon dioxide. The liquid sorbent contacts the gas mixture for transfer of the carbon dioxide from the gas mixture to the liquid sorbent. The carbon dioxide then desorbs from the liquid sorbent using hollow-fiber contactors as a source of heat to liberate the carbon dioxide further separated by the hollow-fiber contactors from the liquid sorbent.

17 Claims, 1 Drawing Sheet

(56) References Cited

U.S. PATENT DOCUMENTS

| | | | |
|---|---|---|---|
| 6,165,253 A * | 12/2000 | Sirkar et al. | 96/6 |
| 6,409,976 B1 | 6/2002 | Poschmann et al. | |
| 7,318,854 B2 | 1/2008 | Sirkar | |
| 7,892,321 B2 * | 2/2011 | Aagesen et al. | 95/45 |
| 2002/0002903 A1 * | 1/2002 | Noack | 95/45 |
| 2003/0101866 A1 * | 6/2003 | Noack | 95/45 |
| 2010/0035751 A1 * | 2/2010 | Perera et al. | 502/402 |
| 2010/0095851 A1 * | 4/2010 | Hu | 96/234 |

OTHER PUBLICATIONS

N. Nishikawa, M. Ishibashi, H. Ohta, N. Akutsu, H. Matsumoto, T. Kamata, H. Kitamura, "CO2 Removal by Hollow-Fiber Gas-Liquid Contactor," Abstract, 1 page, 1995.

Howard Herzog, Jerry Meldon and Alan Hatton, "Advanced Post-Combustion CO2 Capture," Prepared for the Clean Air Task Force, Mar. 1, 2009, 38 pages.

* cited by examiner

US 8,784,532 B2

SORBENT REGENERATION IN A HEATED HOLLOW-FIBER ASSEMBLY

CROSS-REFERENCE TO RELATED APPLICATIONS

This application claims priority benefit under 35 U.S.C. Section 119(e) to U.S. Provisional Application Ser. No. 61/448,858 filed on Mar. 3, 2011, the entire disclosure of which is incorporated herein by reference.

STATEMENT REGARDING FEDERALLY SPONSORED RESEARCH OR DEVELOPMENT

None

FIELD OF THE INVENTION

Embodiments of the invention relate to methods of regenerating sorbent with heated hollow-fiber contactors that also facilitate separation of gases desorbed from the sorbent.

BACKGROUND OF THE INVENTION

Desire to reduce greenhouse gas emissions in various industrial processes requires viable carbon dioxide mitigation strategies. Capture of the carbon dioxide depends on ability to separate the carbon dioxide from a mixture. Separation of the carbon dioxide from the mixture enables transport of the carbon dioxide and subsequent handling or sequestering of the carbon dioxide.

Absorption processes utilize a sorbent to remove the carbon dioxide from the mixture followed by regeneration of the sorbent to liberate the carbon dioxide. The regeneration relies on heating of the sorbent to a temperature at which the carbon dioxide desorbs from the sorbent. Separation of the sorbent from the carbon dioxide released from the sorbent thereby isolates the carbon dioxide.

The regeneration of the sorbent thus contributes to costs and energy requirements associated with such carbon dioxide recovery. Previous energy intense and inefficient approaches for the regeneration utilize steam to transfer heat to the solvent. Factors such as equipment size, operating expense and capital expense contribute to making these past desorption units undesirable.

Therefore, a need exists for methods of desorbing gases from sorbent fluids to regenerate the sorbent fluids used in recovering the gases.

BRIEF SUMMARY OF THE DISCLOSURE

In one embodiment, a method of recovering carbon dioxide and/or hydrogen sulfide includes passing a sorbent loaded with at least one of carbon dioxide and hydrogen sulfide along hollow-fiber contactors of a desorption unit. The method further includes heating the sorbent by applying a DC or AC electrical voltage across the hollow-fiber contactors heated by electrical resistance and/or directing at least one of microwave and radiofrequency energy toward the hollow-fiber contactors which are heated upon absorbing the energy. The heating of the sorbent through thermal contact with the heated hollow-fiber contactors results in at least one of the absorbed gases, the carbon dioxide and the hydrogen sulfide, being released from the sorbent and transferred across walls of the hollow-fiber contactors through pores of the hollow-fiber contactors to regenerate the sorbent.

According to one embodiment, a method of recovering carbon dioxide includes transferring carbon dioxide from a gas mixture to a liquid sorbent and transferring the carbon dioxide from the liquid sorbent into a sweep gas, such as steam. The carbon dioxide transfers from the liquid sorbent to the steam through a hollow-fiber contactor that provides a heat source in addition to phase separation. Condensing the steam separates the carbon dioxide transferred to the steam.

For one embodiment, a system for recovering carbon dioxide and/or hydrogen sulfide includes a sorption unit in fluid communication with a sorbent and a mixture containing at least one of carbon dioxide and hydrogen sulfide for transfer of at least one of the carbon dioxide and the hydrogen sulfide to the sorbent. The system further includes a desorption unit having a heater including at least one of an electromagnetic generator for at least one of microwave and radiofrequency heating of hollow-fiber contactors disposed in the desorption unit and a DC or AC voltage source coupled to the hollow-fiber contactors for resistive heating of the hollow-fiber contactors. A circulation flow path loop couples the sorption and desorption units with the sorbent in fluid communication with a flow path along the hollow-fiber contactors.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Embodiments of the invention relate to recovery of carbon dioxide and/or hydrogen sulfide from a gas mixture, such as flue gas or natural gas that may be recovered as hydrocarbon production from a sour gas field. While described herein with respect to carbon dioxide recovery, systems and methods disclosed also enable hydrogen sulfide ($H_2S$) recovery along with the carbon dioxide or in a same manner as the carbon dioxide recovery, if the hydrogen sulfide is present in the gas mixture either with or without the carbon dioxide. Separating of the carbon dioxide from the gas mixture utilizes a liquid sorbent for the carbon dioxide. The liquid sorbent contacts the gas mixture for transfer of the carbon dioxide from the gas mixture to the liquid sorbent, which may be aqueous amine solutions or ionic liquids. The carbon dioxide then desorbs from the liquid sorbent using hollow-fiber contactors as a source of heat to liberate the carbon dioxide further separated by the hollow-fiber contactors from the liquid sorbent.

Figure 1:
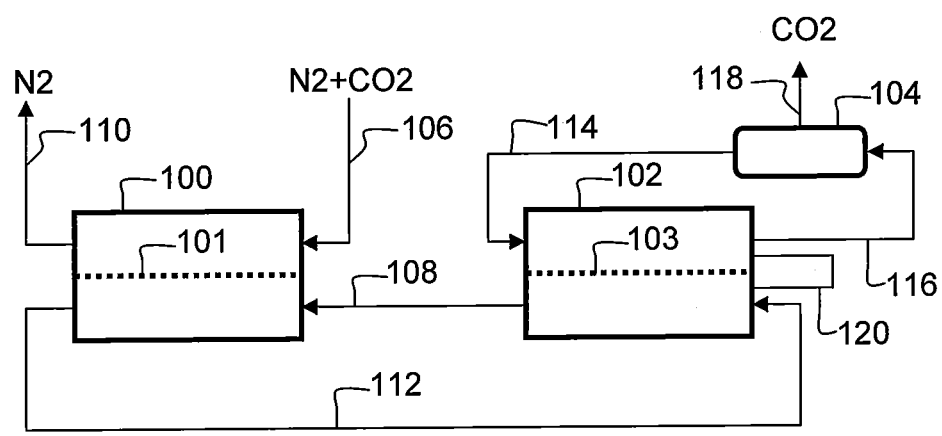
FIG. 1 is a schematic of a contactor system with a sorption unit coupled to a desorption unit that utilizes hollow-fiber contactors as a source of heat, according to one embodiment of the invention.

FIG. 1 illustrates a schematic of a contactor system including an exemplary sorption unit 100 and a desorption unit 102 coupled to a condenser and steam generator 104. The desorption unit 102 as described herein provides sorbent regeneration regardless of specific configuration of the sorption unit 100. For example, the sorption unit 100 may employ other configurations that do not include a plurality of hollow-fiber sorption contactors (represented by a dotted line) 101.

In operation, a gas mixture 106, such as flue gas that contains nitrogen ($N_2$) and carbon dioxide ($CO_2$), enters the sorption unit 100. The gas mixture 106 passes through the sorption unit 100 along a flow path defined by the plurality of hollow-fiber sorption contactors 101 that enable contact of the gas mixture 106 with a liquid stream of lean sorbent 108 passing through the sorption unit 100. Regardless of whether the sorption contactors 101 are utilized, the sorption unit 100 functions to contact the gas mixture 106 with the lean sorbent 108.

The carbon dioxide in the gas mixture 106 diffuses across the hollow-fiber sorption contactors 101. This diffusion at least reduces concentration of the carbon dioxide in a resulting treated output 110 of the sorption unit 100 relative to concentration of the carbon dioxide in the gas mixture 106 that is input into the sorption unit 100. The lean sorbent 108 that sorbs the carbon dioxide transferred through the sorption contactors 101 exits the sorption unit 100 as rich sorbent 112 for feeding into the desorption unit 102.

A sweep gas, such as steam 114, passes through the desorption unit 102 along a flow path defined by a plurality of heated hollow-fiber desorption contactors (represented by a dotted line) 103 that separate the steam 114 from the rich sorbent 112. The desorption unit 102 includes a contactor heating device 120 such that the desorption contactors 103 provide a source of heat for heating the rich sorbent 112. As used herein, the source of heat or heat source refers to origination of heat from another energy form as opposed to transference of heat already generated. The desorption contactors 103 thus heat the rich sorbent 112 without relying on heat transfer from the steam 114 across the desorption contactors 103. In some embodiments, the heating provided by operation of the contactor heating device 120 alone raises temperature of the rich sorbent 112 to above 100° C. or between 120° C. and 140° C. by heat transfer from the desorption contactors 103.

Examples of the heating device 120 include at least one of an electromagnetic generator for microwave and/or radiofrequency heating of the desorption contactors 103 and a voltage source coupled to the desorption contactors 103 for resistive heating of the desorption contactors 103. The resistive heating may utilize either direct and/or alternating current. If employing a microwave generator, the heating device 120 may generate electromagnetic energy at 915 megahertz (MHz) or 2,450 MHz, for some embodiments, or at another frequency selected to correspond with a microwave absorption spectrum of the desorption contactors 103. Some embodiments heat the desorption contactors 103 through a combination of the resistive heating and the microwave heating. Further, the resistive heating and the microwave heating of the desorption contactors 103 may to a lesser extent increase temperature of the rich sorbent 112 as a result of direct microwave absorption by the rich sorbent 112 and/or induced heating from electrical resistance of the rich sorbent 112.

Heat transfers from the desorption contactors 103 to the rich sorbent 112 for liberating the carbon dioxide from the rich sorbent 112 thereby regenerating the lean sorbent 108 supplied to the sorption unit 100. The carbon dioxide carried by the steam 114 exits the desorption unit 102 as a combined vapor stream 116 input into the condenser and steam generator 104. In the condenser and steam generator 104, the carbon dioxide separates from liquid water upon cooling of the combined vapor stream 116 and steam condensation. Overhead of the carbon dioxide separated from the water forms a recovered carbon dioxide output 118. Subsequent heating of the water by the condenser and steam generator 104 produces the steam 114 that is recycled for feeding to the desorption unit 102.

In comparison to using the steam 114 for sweeping the carbon dioxide liberated from the rich sorbent 112, relying on steam-based heating for all heating requirements of desorption requires extra expense of a relative higher quality steam. Some embodiments may further utilize gases other than steam as the sweep gas or generate a vacuum to carry away for processing any of the carbon dioxide transferred between inside and outside of the desorption contactors 103. Suitable gases for the sweep gas include hydrocarbons, such as pentane, or other gases condensable to provide relative easier separation from the carbon dioxide based on boiling points than separation of the carbon dioxide from the gas mixture 106.

Figure 2:
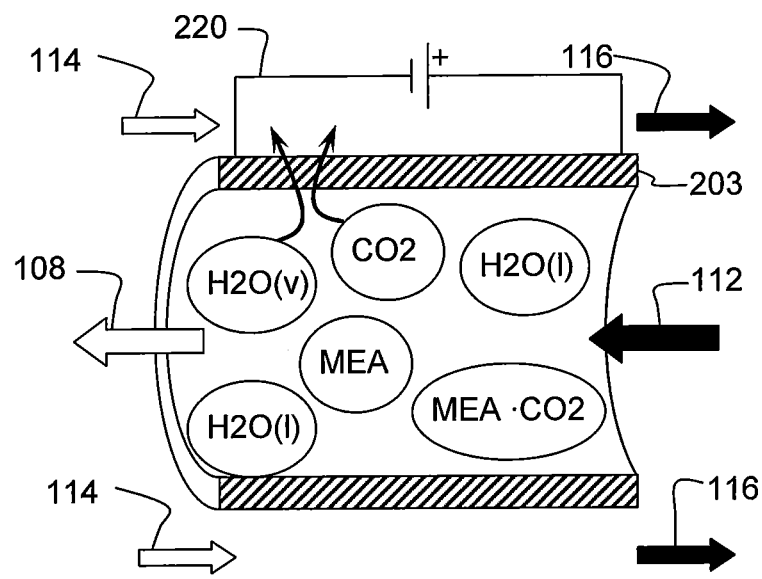
FIG. 2 is a cross-sectional representation of one of the hollow-fiber contactors, according to one embodiment of the invention.

FIG. 2 shows a cross-sectional representation of a single fiber 203 referred to herein as hollow-fiber due to having a cylindrical structure with an open interior bore and a diameter between about 200 microns and about 2 millimeters. Multiple lengths of the fiber 203 assembled together may exemplify the heated hollow-fiber desorption contactors 103 disposed in the desorption unit 102 depicted in FIG. 1. In some embodiments, a voltage source 220 applies a voltage across the fiber 203 to provide resistive heating of the fiber 203.

The rich sorbent 112 containing the carbon dioxide ($CO_2$), monoethanolamine (MEA) and liquid phase water ($H_2O(l)$), for example, may flow through the interior bore of the fiber 203 without being dispersed in the steam 114 flowing along an exterior of the fiber 203. Since the fiber 203 is permeable to gas, the carbon dioxide and some vaporized water ($H_2O$ (v)) resulting from the heating pass through pores of the fiber 203 leaving behind within the fiber 203 the lean sorbent 108 that is thereby regenerated. In some embodiments, the steam 114 may flow through the interior bore of the fiber 203 without being dispersed in the rich sorbent 112 flowing along the exterior of the fiber 203.

Packing density for multiple lengths of the fiber 203 and surface area of the fiber 203 enable efficient thermal transfer. The fiber 203 achieves surface areas of 1500 $m^2/m^3$ or more. The surface area achieved with use of the fiber 203 correlates to heat source size since the fiber 203 is heated.

Pore size and hydrophobic properties of the fiber 203 maintain separation of a bulk gas phase (e.g., the steam 114) from a bulk liquid phase (e.g., the rich sorbent 112). This non-dispersive flow through the desorption unit 102 avoids problematic issues including flooding, entrainment, channeling and foaming that often occur with dispersive contacting. The non-dispersive flow further enables control of gas and/or liquid flow rates without limitations of fluid-mechanics within towers that utilize the dispersive contacting.

In some embodiments, a hydrophobic polymeric material that can be processed into the hollow-fiber thus forms the fiber 203. Suitable materials that form the fiber 203 can dissolve in a spinning solvent, be cast into the fiber 203 and be compatible with sorbent formulations desired for use in removing the carbon dioxide. Various exemplary compositions of polymer that may form the fiber 203 satisfy foregoing criteria and include but are not limited to polysulfones, polyimides, polyethers, polycarbonates, fluoropolymers, or polymers of amides with various other constituent monomer combinations.

For some embodiments, a spinning process fabricates the fiber 203 from an extrusion mixture of the polymer (e.g., polyimide) and the solvent for the polymer. Examples of suitable solvents include N-methyl-2-pyrrolidone (NMP), dimethylformamide (DMF), dimethylacetamide (DMAc) and dimethyl sulfoxide (DMSO). These solvents provide miscibility in water that is high enough to promote phase separation during quenching of the extrusion mixture in an aqueous media while spinning. Concentration of the polymer in the extrusion mixture influences pore size and porosity given that pore size and porosity increase as the concentration of the polymer in the extrusion mixture decreases.

In some embodiments, the extrusion mixture includes an additive, such as a conductive agent or microwave absorbent, for incorporation into the fiber 203 to facilitate the heating described herein. Examples of the additive include metallic or carbonaceous particles, such as graphite powder. Particle size of the additive when applied to the extrusion mixture may range from one nanometer to one micron. Preparing the fiber 203 by spinning a composition doped with the conducting agent enables heating of the fiber 203 with the voltage source 220 upon passing current through a network of the conductive material within the fiber 203. The carbonaceous particles may also function as the microwave absorbent to facilitate heating of the fiber 203 with microwave energy.

Some embodiments apply the additive as a coating on the fiber 203. Such coating techniques include incipient wetness deposition or vapor deposition. The additive may coat an inside surface of the fiber 203, an outside surface of the fiber 203 or both the inside and outside surfaces of the fiber 203.

The extrusion mixture used in some embodiments includes the solvent and carbonaceous material dispersed in the solvent along with the polymer or instead of the polymer. The carbonaceous material, such as pitch, results in the fiber 203 formed upon the spinning containing carbon. Following the spinning, the carbonaceous material may further be carbonized to prepare the fiber 203 having a carbon content that aides in the heating as described herein.

For some embodiments, preparing the fiber 203 includes preheating the carbonaceous material or a polymeric material, such as the polymer described herein, to a temperature sufficient to carbonize the material forming the fiber 203 that is thereby made conductive due to its carbon content. The materials suitable for such carbonization decompose to carbon without melting and may be those used in commercial hollow-fiber contactors without the carbonization. By way of example, a hollow-fiber contactor made from the material, such as polyimides, may carbonize upon preheating the polymeric material to a temperature above 400° C. in order to form the fiber 203. As used herein, carbonization may result in the fiber 203 having at least 85%, at least 90% or at least 95% carbon content by weight.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
   providing hollow-fiber contactors in a desorption unit where the hollow-fiber contactors are formed by spinning a composition doped with a conducting agent;
   passing a sorbent loaded with at least one of carbon dioxide and hydrogen sulfide along the hollow-fiber contactors of the desorption unit; and
   heating the sorbent by at least one of applying a voltage across the hollow-fiber contactors heated by electrical resistance and directing at least one of microwave and radiofrequency energy toward the hollow-fiber contactors which are heated upon absorbing the energy, wherein the heating of the sorbent through thermal contact with the hollow-fiber contactors which are heated results in absorbed gases including at least one of the carbon dioxide and the hydrogen sulfide being released from the sorbent and transferred across walls of the hollow-fiber contactors through pores of the hollow-fiber contactors to regenerate the sorbent.

2. The method according to claim 1, wherein the heating includes the applying of the voltage across the hollow-fiber contactors.

3. The method according to claim 1, wherein the heating includes the directing of microwave energy toward the hollow-fiber contactors.

4. The method according to claim 1, further comprising preparing the hollow-fiber contactors by preheating a polymeric material to a temperature sufficient to carbonize the polymeric material forming the hollow-fiber contactors.

5. A method, comprising:
   passing a sorbent loaded with at least one of carbon dioxide and hydrogen sulfide along the hollow-fiber contactors of the desorption unit; and
   heating the sorbent by at least one of applying a voltage across the hollow-fiber contactors heated by electrical resistance and directing at least one of microwave and radiofrequency energy toward the hollow-fiber contactors which are heated upon absorbing the energy, wherein the heating of the sorbent through thermal contact with the hollow-fiber contactors which are heated results in absorbed gases including at least one of the carbon dioxide and the hydrogen sulfide being released from the sorbent and transferred across walls of the hollow-fiber contactors through pores of the hollow-fiber contactors to regenerate the sorbent;
   wherein current passes through a network of conductive material that is at least one of graphitic and metallic within the hollow-fiber contactors.

6. The method according to claim 1, wherein the sorbent includes an aqueous amine.

7. The method according to claim 1, wherein the sorbent is loaded with the carbon dioxide.

8. The method according to claim 1, further comprising generating a vacuum to carry away for processing any of the carbon dioxide and the hydrogen sulfide transferred through the pores of the hollow-fiber contactors.

9. The method according to claim 1, further comprising passing a sweep gas along a first flow path separated by the hollow-fiber contactors from a second flow path of the sorbent, wherein the sweep gas carries away for processing any of the carbon dioxide and the hydrogen sulfide that are transferred through the pores of the hollow-fiber contactors.

10. The method according to claim 1, further comprising passing steam along a flow path in fluid communication with any of the carbon dioxide and the hydrogen sulfide that are transferred through the pores of the hollow-fiber contactors and then condensing the steam to provide separation of gases and liquids.

11. The method according to claim 1, wherein the heating raises temperature of the sorbent to above 100° C.

12. The method according to claim 1, wherein the heating alone raises temperature of the sorbent to above 100° C. by heat transfer from the hollow-fiber contactors.

13. The method according to claim 1, wherein the heating includes both the directing of the microwave energy toward the hollow-fiber contactors and the applying of the voltage across the hollow-fiber contactors.

14. A method, comprising:
    transferring carbon dioxide from a gas mixture to a liquid sorbent;
    transferring the carbon dioxide from the liquid sorbent into a sweep gas through a hollow-fiber contactor by heating the hollow-fiber contactors wherein the hollow-fiber contactors are formed by spinning a composition doped with a conducting agent and this step of transferring the carbon dioxide from the liquid sorbent into a sweep gas further includes providing a heat source in addition to phase separation; and
    condensing the sweep gas to separate the carbon dioxide transferred to the sweep gas;
    wherein current passes through a network of conductive material that is at least one of graphitic and metallic within the hollow-fiber contactors.

15. The method according to claim 14, wherein the hollow-fiber contactors are heated by applying a voltage across the hollow-fiber contactors.

16. The method according to claim 14, wherein the hollow-fiber contactors are heated by directing microwave energy toward the hollow-fiber contactors.

17. A method, comprising:
    transferring carbon dioxide from a gas mixture to a liquid sorbent;
    transferring the carbon dioxide from the liquid sorbent into a sweep gas through a hollow-fiber contactor by heating the hollow-fiber contactors wherein current passes through a network of conductive material that is at least one of graphitic and metallic within the hollow-fiber contactors and this step of transferring the carbon dioxide from the liquid sorbent into a sweep gas further includes providing a heat source in addition to phase separation; and
    condensing the sweep gas to separate the carbon dioxide transferred to the sweep gas.

* * * * *